United States Patent
Lee (10) Patent No.: US 11,258,344 B1
(45) Date of Patent: Feb. 22, 2022

(54) HIGH TORQUE RELUCTANCE BRAKE DEVICE

(71) Applicant: CHI HUA FITNESS CO., LTD., Hsinchu County (TW)

(72) Inventor: Chia Jung Lee, Hsinchu County (TW)

(73) Assignee: Chi Hua Fitness Co., Ltd., Hsinchu County (TW)

( * ) Notice: Subject to any disclaimer, the term of this patent is extended or adjusted under 35 U.S.C. 154(b) by 0 days.

(21) Appl. No.: 17/036,515

(22) Filed: Sep. 29, 2020

(51) Int. Cl.
| | | |
|---|---|---|
| *H02K 49/04* | (2006.01) | |
| *H02K 7/10* | (2006.01) | |
| *A63B 21/22* | (2006.01) | |
| *H02P 15/00* | (2006.01) | |
| *A63B 21/005* | (2006.01) | |
| *H02K 7/02* | (2006.01) | |
| *H02K 7/106* | (2006.01) | |
| *H02K 7/104* | (2006.01) | |

(52) U.S. Cl.
CPC ....... *H02K 49/043* (2013.01); *A63B 21/0056* (2013.01); *A63B 21/225* (2013.01); *H02K 7/02* (2013.01); *H02K 7/10* (2013.01); *H02K 7/104* (2013.01); *H02K 7/1004* (2013.01); *H02K 7/106* (2013.01); *H02P 15/00* (2013.01)

(58) Field of Classification Search
CPC .......... H02K 7/02; H02K 7/025; H02K 21/22; H02K 21/222; H02K 49/043; H02K 7/106; H02K 7/104; H02K 7/10; H02K 7/1004; Y02E 60/16; H02P 15/00; A63B 21/225; A63B 21/0056
USPC ...................................... 310/75, 77
See application file for complete search history.

(56) References Cited

U.S. PATENT DOCUMENTS

| | | | |
|---|---|---|---|
| 6,581,731 B2* | 6/2003 | Chen ..................... | B60T 13/748 188/164 |
| 2014/0035414 A1* | 2/2014 | Hsieh ..................... | H02K 21/22 310/96 |
| 2017/0047870 A1* | 2/2017 | Lee ........................... | H02P 3/14 |
| 2018/0102695 A1* | 4/2018 | Lee ...................... | H02K 1/2786 |

* cited by examiner

Primary Examiner — Ahmed Elnakib
(74) Attorney, Agent, or Firm — Rosenberg, Klein & Lee (57) ABSTRACT

A high torque reluctance brake device for fitness equipment, comprising: an external rotor including a flywheel and an outer ring body; at least two magnetic resistance mechanisms, each of them has a brake field core, a magnetic coil; a support frame for arranging magnetic resistance mechanisms to form an angle larger than 30 degree and to make between the outer periphery of the brake field core and the outer ring body has a gap; the control circuit unit transmits suitable current to the magnetic coil, then between the brake field core and the magnetic ring produced a eddy current magnetic resistance and forms a reverse resistance to the external rotor. By choosing different resistance setting can increase the variability of exercise and improve the comfort of exercise.

4 Claims, 12 Drawing Sheets

HIGH TORQUE RELUCTANCE BRAKE DEVICE

BACKGROUND OF THE INVENTION

1. Field of the Invention

The invention relates to a fitness equipment, especially to one that has a high torque reluctance brake device having a control circuit for providing corresponding current according to required torque value to make the rotated flywheel that coupled to the magnetic resistance mechanism with predetermined angle produces a reverse resistance.

2. Description of the Related Art

Figure 1A:
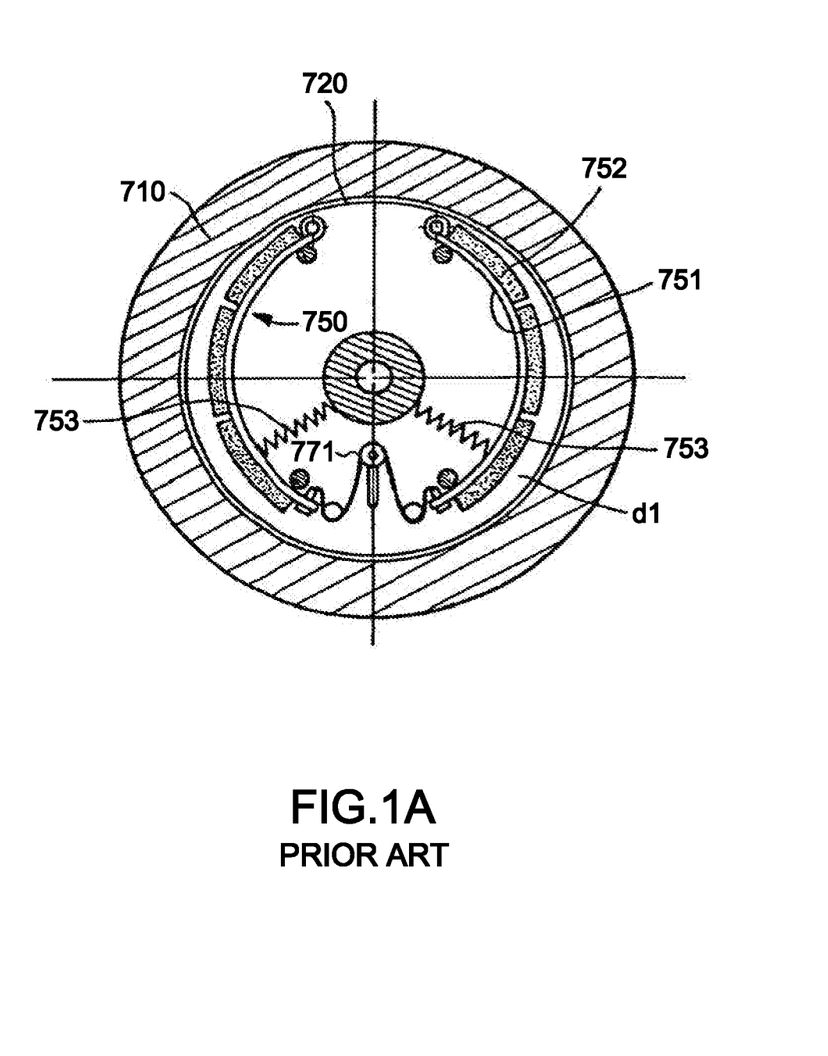
FIG. 1A is a schematic diagram illustrating structure of magnetic adjustable loading device with eddy current according to the prior art.

The flywheel is widely used in many fitness equipment for providing exercise load by the inertia of rotation; FIG. 1A illustrated a U.S. Pat. No. 5,711,404 a magnetic adjustable loading device with eddy current, the device including: a rotor compose of a flywheel 710 and a metal conductor 720; a stator 750 composed of iron sheet 751 and permanent magnet 752 is arranged at the inner periphery, by the leading of the adjustment device 771 makes the iron sheet 751 displaced and further change the gap dl between the rotor 710,720 and the stator 750, so the magnetic flux density is changed to achieve the effect of stepless continuous adjustment of load resistance; However, the adjustment device 771 is manually controlled and cannot achieve the effect of automatic adjustment of load, so this patent has the disadvantage of lack of automatic adjustment.

Figure 1B:
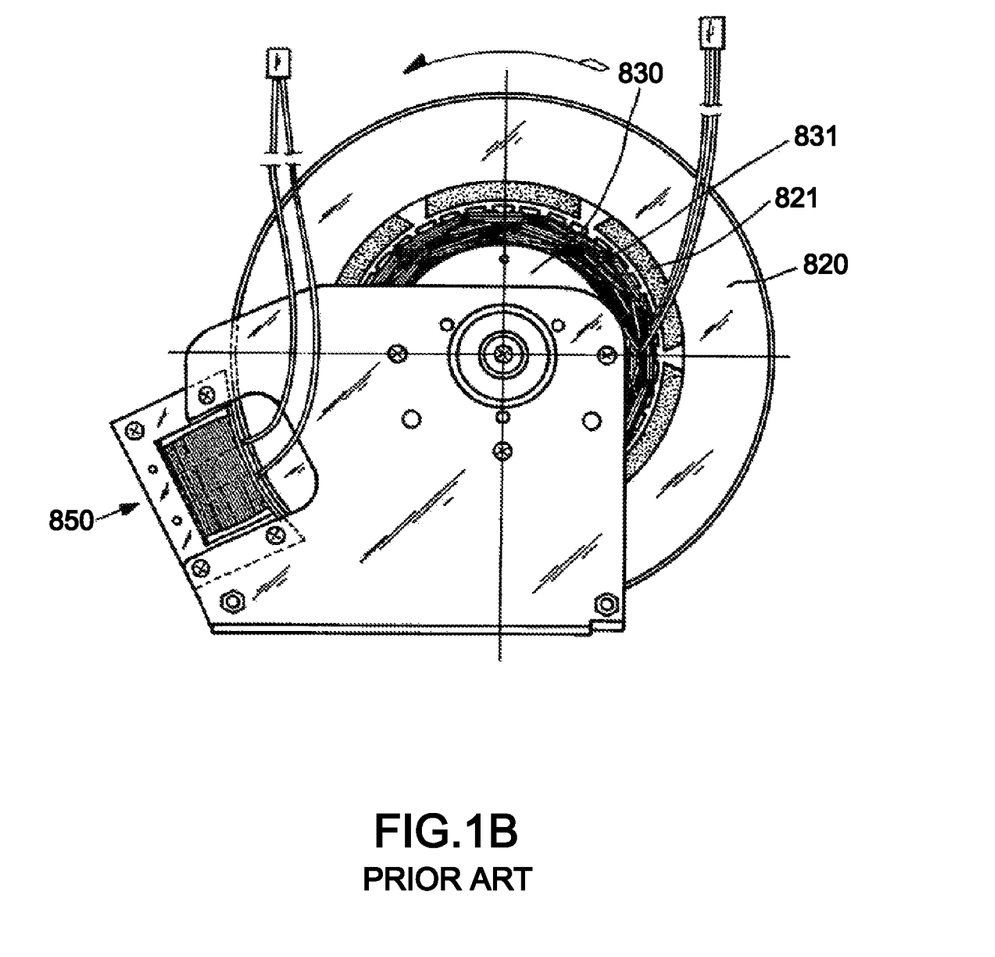
FIG. 1B is a schematic diagram illustrating structure of brake device with a combination of power-generating and eddy-current magnetic resistance according to the prior art.

In recent years, fitness equipment often uses flywheels installed with permanent magnets, and then use armatures as stators to make stator coils generate current to be the power that provided for the control and the brake load; FIG. 1B illustrated a U.S. Pat. No. 6,084,325 a brake device with a combination of power-generating and eddy-current magnetic resistance, the device including: a flywheel 820 rotated by the rotate wheel, the flywheel 820 is stuck to a permanent magnet 821 and stator core 830 to form a magnetic circuit, and further make the coil 831 generate current; the current is rectified and filtered into DC for providing power to the control panel and brake field core 850, making the brake field core 850 generate a eddy current and further causes a reluctance effect to flywheel 820; this kind of structure can achieve excellent sports effects, and the output power of the generator is closely related to the speed, since the speed of the generator is limited by the magnetic resistance, it has not performed its due efficiency; moreover, the mechanism is more complicated and the manufacturing cost is higher, so it is not suitable for installation on small or less control functions fitness equipment.

SUMMARY OF THE INVENTION

It is a primary objective of the present invention to provide an eddy current reluctance brake device having the function of automatic adjustment that can be applied on small fitness equipment.

It is another objective of the present invention to provide a high torque reluctance brake device that can reduce the manufacturing cost and improve the load efficiency.

It is another objective of the present invention to provide a high torque reluctance brake device that has a transmission port for loading the resistance curve diagram in order to increase the variability of exercise and improve the comfort of exercise.

In order to achieve the above objectives, the present invention including: a support frame, a rotate shaft, an external rotor, at least two magnetic resistance mechanism, and a control circuit unit; wherein the support frame having a front frame body and a rear frame body fixed by multiple positioning rod, and the support frame having a fixing base for fixing on the frame of the fitness equipment; the rotate shaft pivoted in a shaft hole of the support frame; the transmission wheel pivoted on the rotate shaft and located on the outer side of the support frame for receiving the power transmitted by fitness equipment; the external rotor including a flywheel and a magnetic ring, the flywheel has a wheel nave arranged at the center, and the wheel nave has a shaft hole for setting the wheel nave on the rotate shaft, the magnetic ring has high magnetic flux density and arranged closely on the outer periphery of an outer ring body of the flywheel, and the transmission wheel drives the external rotor to rotate; the magnetic resistance mechanisms, each of them has a brake field core, a magnetic coil, an input wire connected to the magnetic coil, a front bracket, and a rear bracket, the brake field core has a containing space for arranged the magnetic coil, the front bracket and the rear bracket fix the brake field core at the positioning hole of the front and rear frame body, the magnetic resistance mechanisms are arranged at the outer periphery of the magnetic ring and form an angle greater than 30 degrees and less than 180 degrees between each other, and between the outer periphery of the brake field core and the magnetic ring has a magnetic field gap; the control circuit unit installed on the side of the support frame in a built-in form, the control circuit unit has at least a micro processer, a DC control circuit, an input device for inputting required torque value, and a transmission port for loading the resistance curve diagram, the control circuit is connected to a direct current and electrically connected to the input wire of the magnetic coil.

Whereby the micro processer produces a control signal to the DC control circuit after calculating the required torque value and further provides a suitable current transmitted to the magnetic coil of the magnetic resistance mechanisms, and the current of the magnetic coil will generate a magnetic field on the brake field core through the principle of electromagnetic induction, then a closed magnetic circuit is formed between the magnetic field and the coupled rotated magnetic ring; since the external rotor is rotating, the closed magnetic circuit will be destroyed, according to Lenz's law, when a stable magnetic circuit is destroyed by external force, a reverse resistance of the same magnitude will be produced to resist so as to achieve the effect of providing an exercise load, and by choosing resistance curve diagram can increase the variability of exercise and improve the comfort of exercise.

Also, the included angle of the two magnetic resistance mechanisms is larger than 30 degree and smaller than 90 degree.

Also, the transmission wheel is a belt pulley.

With the features disclosed above, the present invention, high torque reluctance brake device, has below benefits:

1. The present invention has the transmission wheel that drives the external rotor to rotate, and has a flywheel for providing inertia rotation and a magnetic ring having high magnetic flux density; the magnetic resistance mechanisms have a brake field core, a magnetic coil, and a magnetic field gap is between the outer periphery of the brake field core and the magnetic ring, in order to produce reluctance effect; The present invention has an input device for inputting the torque value, and the DC control circuit will generate a suitable current accordingly to the magnetic coil to form the required exercise resistance; Since the stator coil and AC/DC conversion components required for power generation are not arranged in the present invention, it can simplify the mechanism, reduce the volume, and reduce the manufacturing cost, and it can be applied to small fitness equipment; The present invention controls the reluctance load by the magnitude of the current applied to the magnetic coil. Since the mechanism is a non-contact resistance device, the present invention also has the advantages of easy control of resistance, no wear of components, and low maintenance cost.

2. The external rotor of the present invention includes a flywheel for providing inertia rotation and a magnetic ring having high magnetic flux density, and the magnetic ring arranged closely on the outer periphery of an outer ring body of the flywheel, and the transmission wheel drives the external rotor to rotate; two magnetic resistance mechanisms arranged at the outer periphery of the magnetic ring, and between the outer periphery of the brake field core and the magnetic ring has a magnetic field gap; since a suitable current is transmitted to the magnetic coil of the magnetic resistance mechanisms, and the current of the magnetic coil will generate a magnetic field on the brake field core, according to Lenz's law, the magnetic field will give a reverse resistance of the same magnitude to the magnetic ring; since the magnetic ring having high magnetic flux density and the magnetic resistance mechanisms are arranged at the outer periphery of the magnetic ring and form an angle greater than 30 degrees and less than 180 degree, than the magnetic lines of the brake field core will not interfere with each other, and the eddy current reluctance will reach the highest torque, so the present invention can achieve the effect of high-efficiency exercise loads.

3. The present invention includes an input device for inputting required torque value, and a transmission port for loading the resistance curve diagram; After the user key in the required torque value, the micro processer of the control circuit unit calculates the required torque value and the resistance curve diagram, the micro processer further provides a suitable current transmitted to the magnetic coil of the magnetic resistance mechanisms, then between the brake field core and the magnetic ring produced a eddy current magnetic resistance and forms a reverse resistance to the external rotor. Because the resistance curve diagram allows the user to feel the smooth resistance of different difficulties, it can not only improve the comfort but also avoid the injury caused by the sudden resistance change. Therefore, by choosing different resistance curve diagram can increase the variability of exercise and improve the comfort of exercise.

DETAILED DESCRIPTION OF THE PREFERRED EMBODIMENT

For better understanding of present invention, I provide the embodiment and drawing enclosed for detailed description. Those who skilled in the art can understand purpose, the feature and benefit of the present invention from the contents disclosed in this specification. Kindly noted that the present invention can be implemented or applied through other different specific embodiments and based on different viewpoints various details in this specification can be various changed without departing from the spirit of the present invention. In addition, the drawings attached to the present invention are merely a schematic illustration and they are not depicted in actual dimensions. The following embodiments will further describe the related technical content of the present invention in detail, but the disclosed content is not intended to limit the technical scope of the present invention Referring to FIG. 2, the high torque reluctance brake device for fitness equipment 100 comprising: a support frame 10 formed by a front frame body 11 and a rear frame body 12, the upper end of the front frame body 11 and the rear frame body 12 have a shaft hole 13, around the shaft hole 13 has multiple positioning holes 14 arranged with equal space, the lower end of the front frame body 11 and the rear frame body 12 have a fixing base 15, and by locking the bolt with fixing slot 16 fixes the support frame 10 on the fitness equipment; multiple positioning rods 17 fixed by screw nuts inside the multiple positioning holes 14, making the front frame body 11 and the rear frame body 12 combine as one; an external rotor 20 including a flywheel 21 and a magnetic ring 22, the flywheel 21 is an inertia rotate disc having an outer ring body 211 and an outer ring body 212, and the center of the outer ring body 212 has a wheel nave 214 with a shaft hole 213; a rotate shaft 30 set through the shaft hole 213 and engaged with a connect key 215 to make the rotate shaft 30 and flywheel 21 rotated simultaneously; a transmission wheel 40 arranged by a one-way bearing 31 on one ends of the rotate shaft 30 for receiving the power transmitted by fitness equipment in one direction, and the transmission wheel 40 of the present invention is a belt pulley; the rotate shaft 30 is arranged at the both side of the flywheel 21 and the wheel nave 214, each of them has a ball-bearing 32, around the ball-bearing 32 has a bearing housing 33, the front and rear ends of the bearing housing 33 is locked inside the shaft hole 13 of the front frame body 11 and rear frame body 12.

Figure 2:
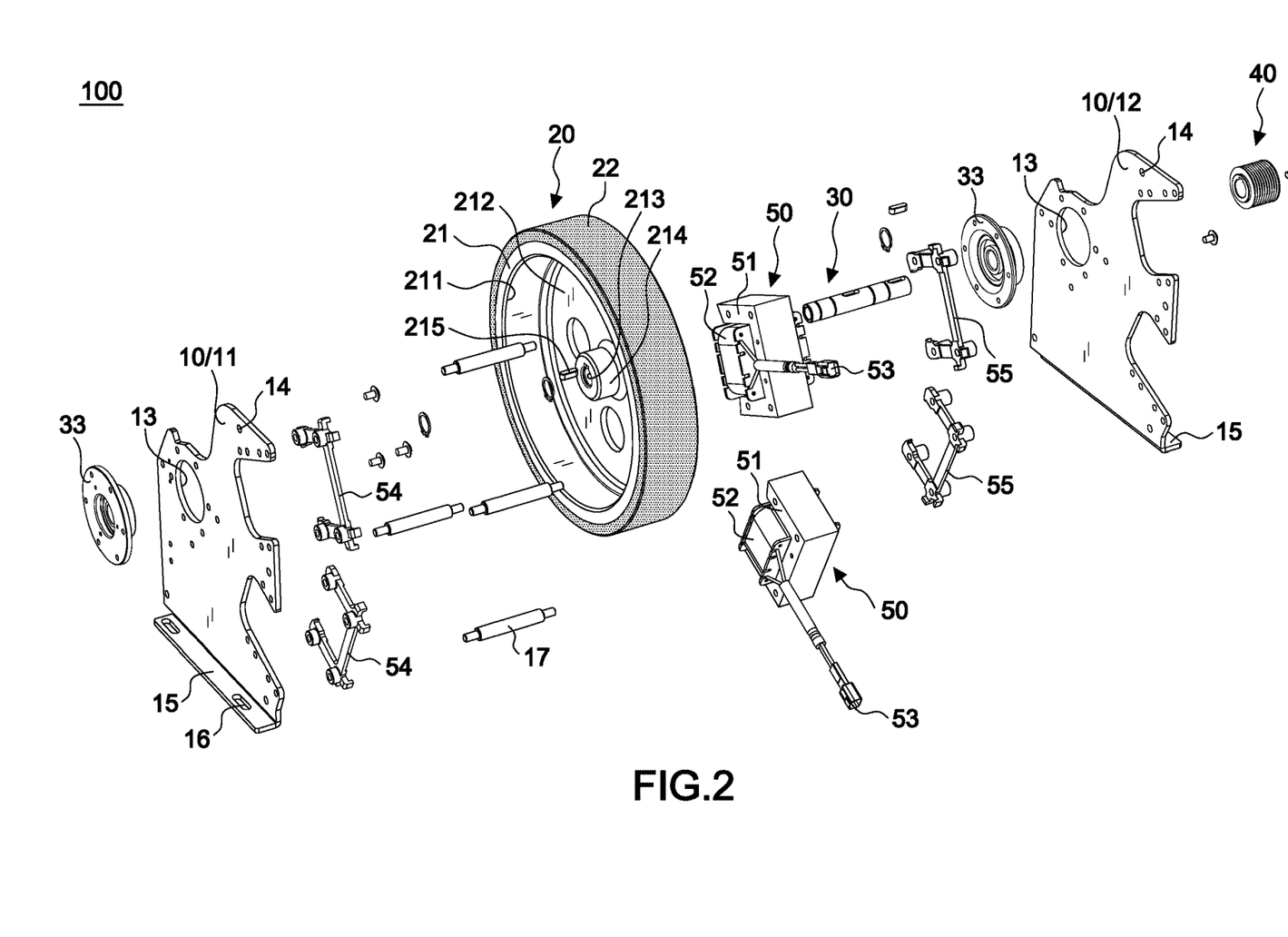
FIG. 2 is an exploded perspective view of the present invention.
Figure 3:
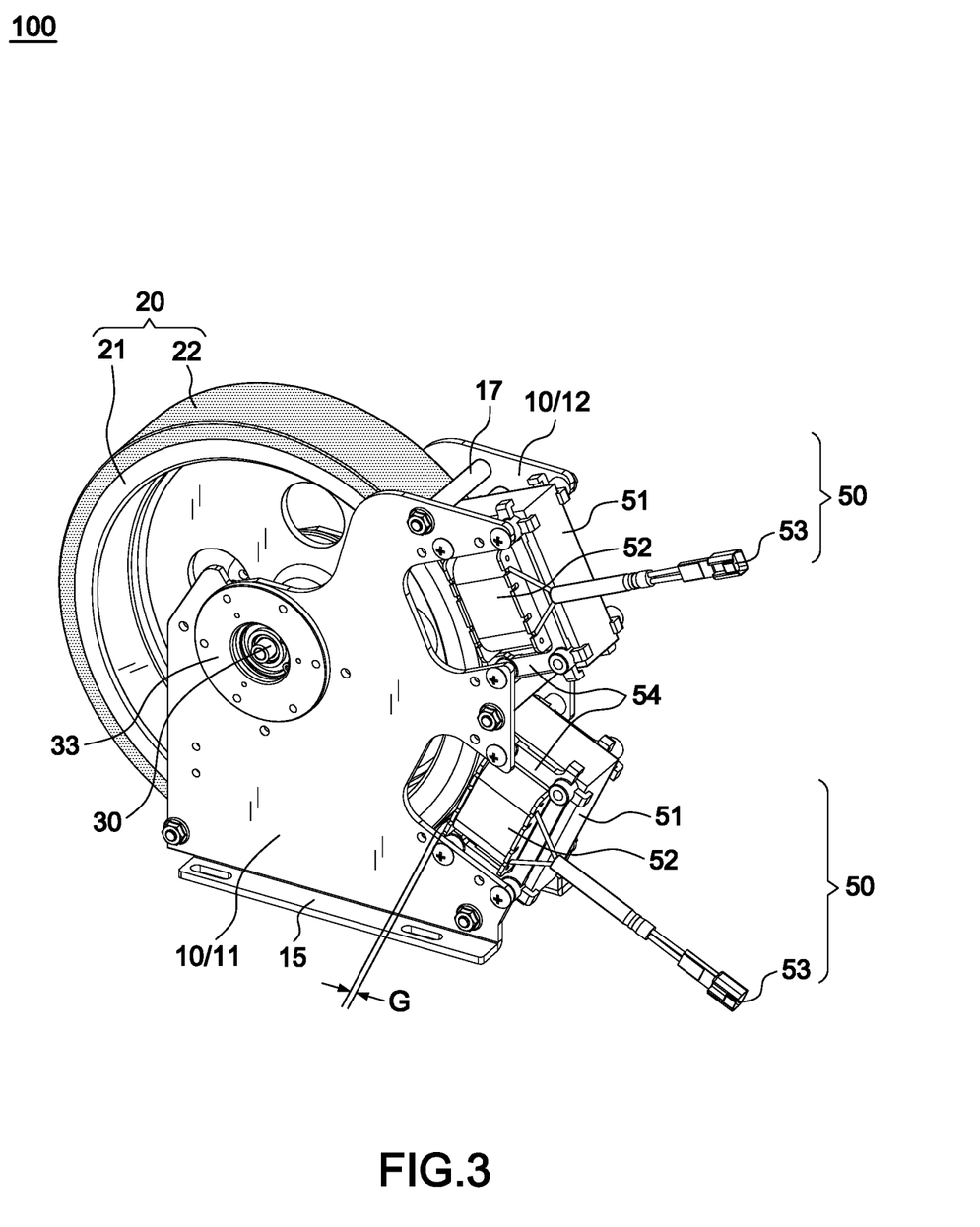
FIG. 3 is an assembly perspective front views of the first embodiment of the present invention.
Figure 4:
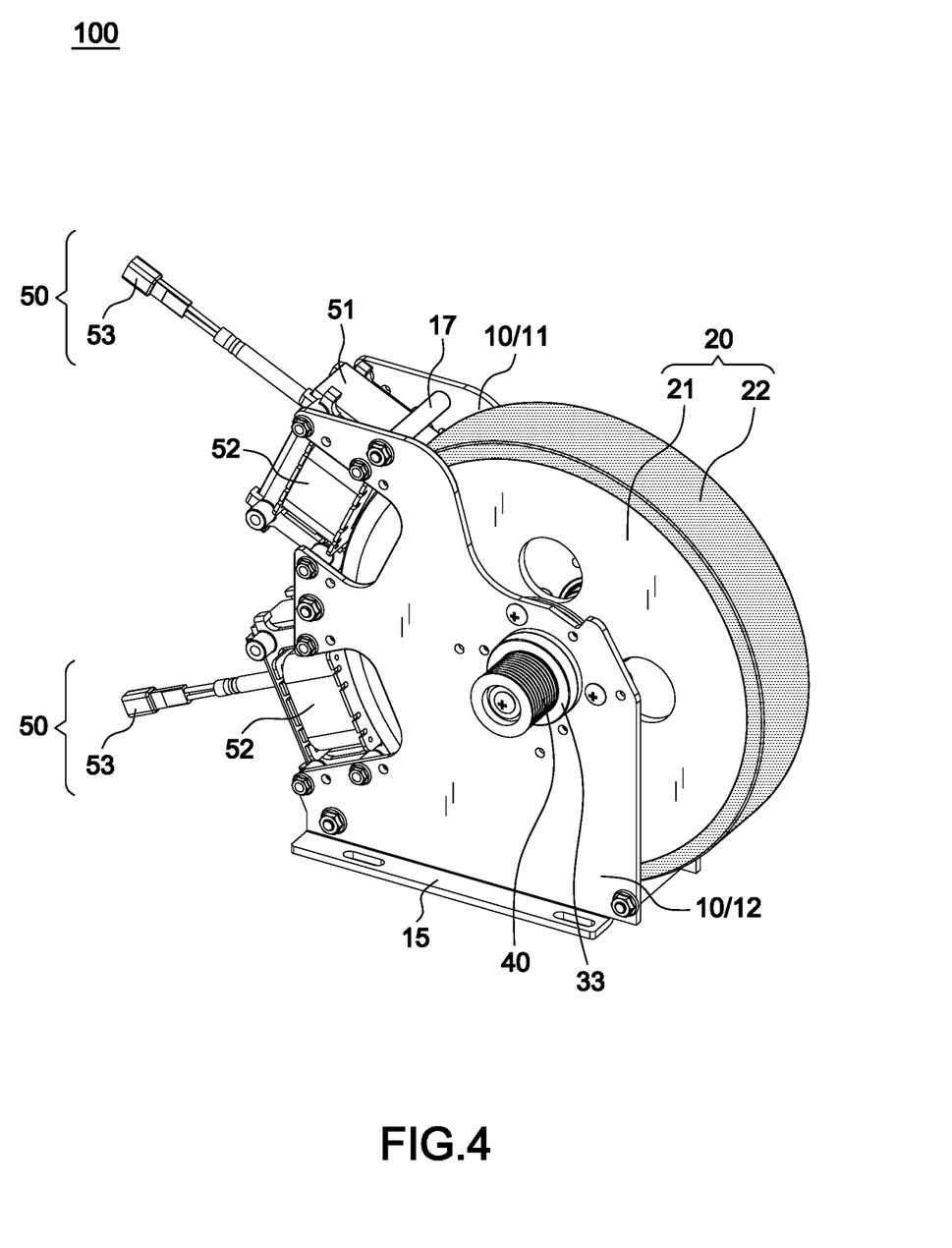
FIG. 4 is an assembly perspective rear view of the first embodiment of the present invention.
Figure 5:
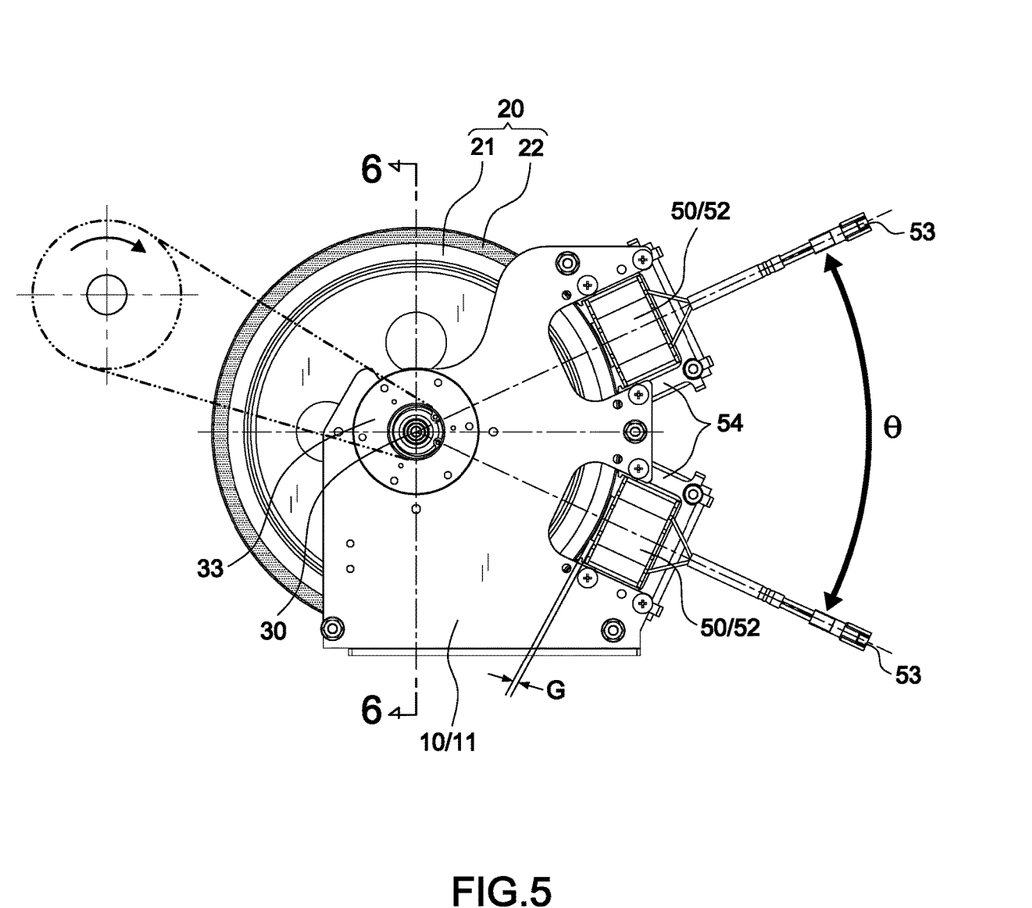
FIG. 5 is an assembly front views of the first embodiment of the present invention.
Figure 6:
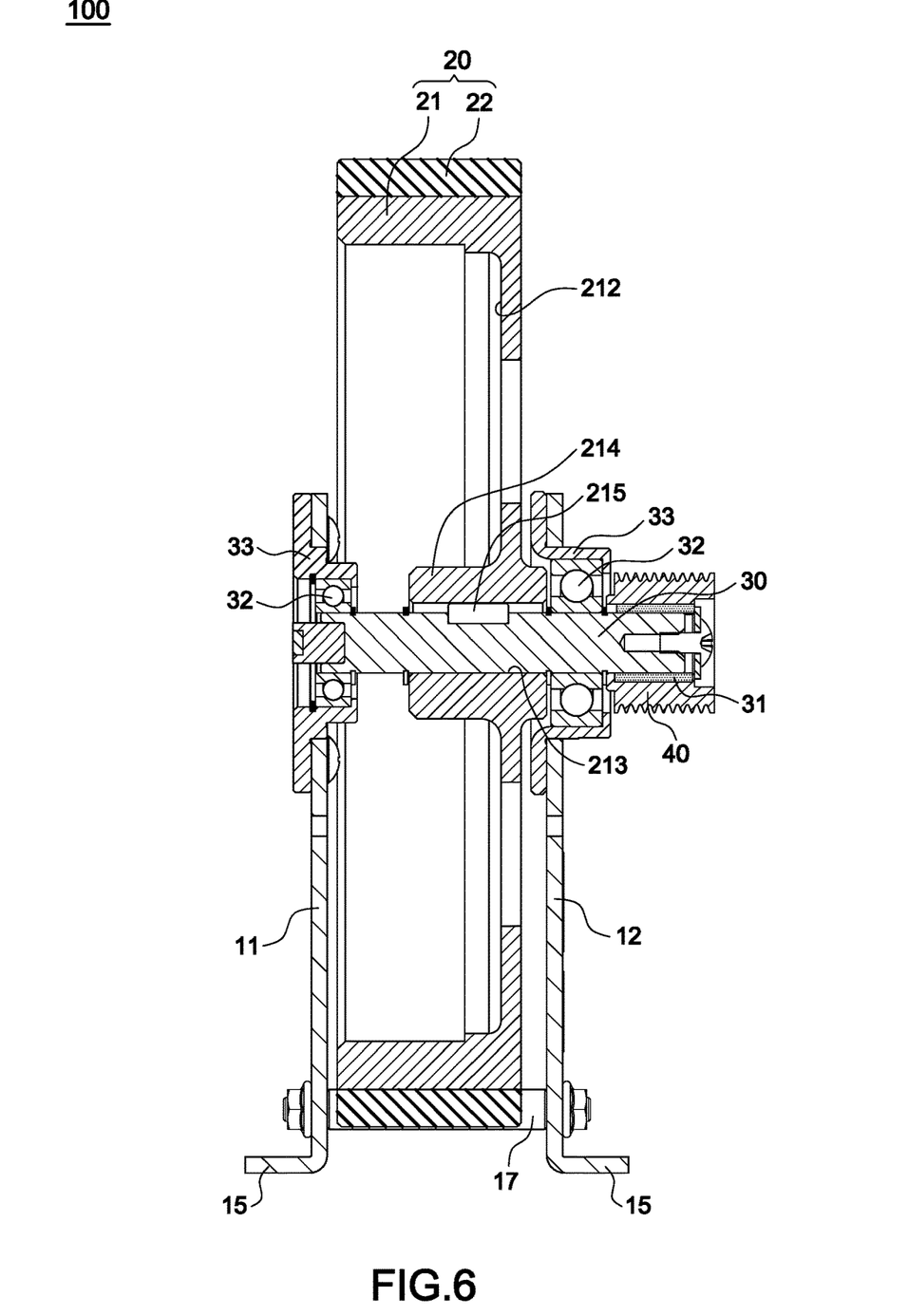
FIG. 6 is an assembly sectional views of the present invention.
Figure 10:
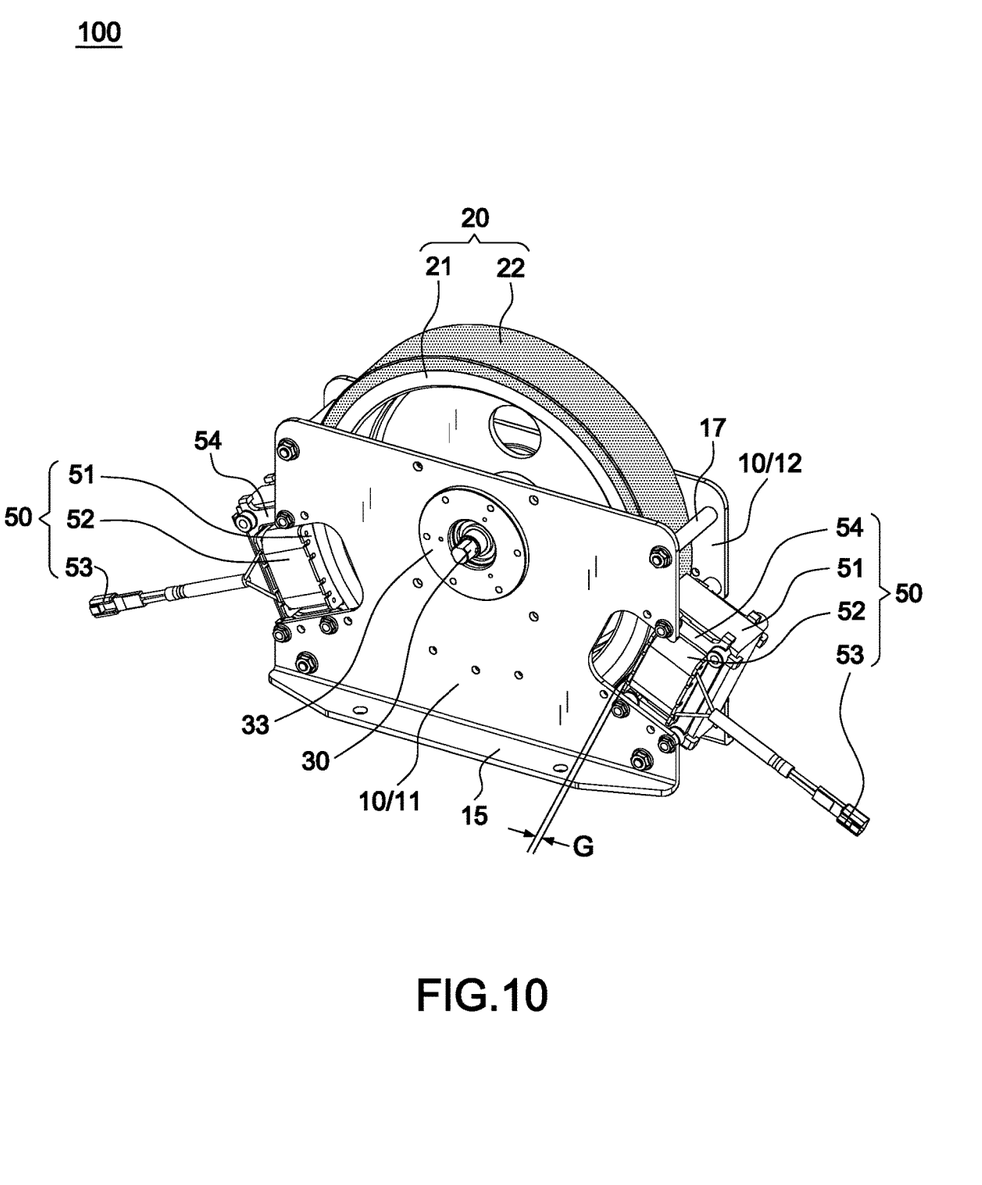
FIG. 10 is an assembly perspective views of the second embodiment of the present invention.
Figure 11:
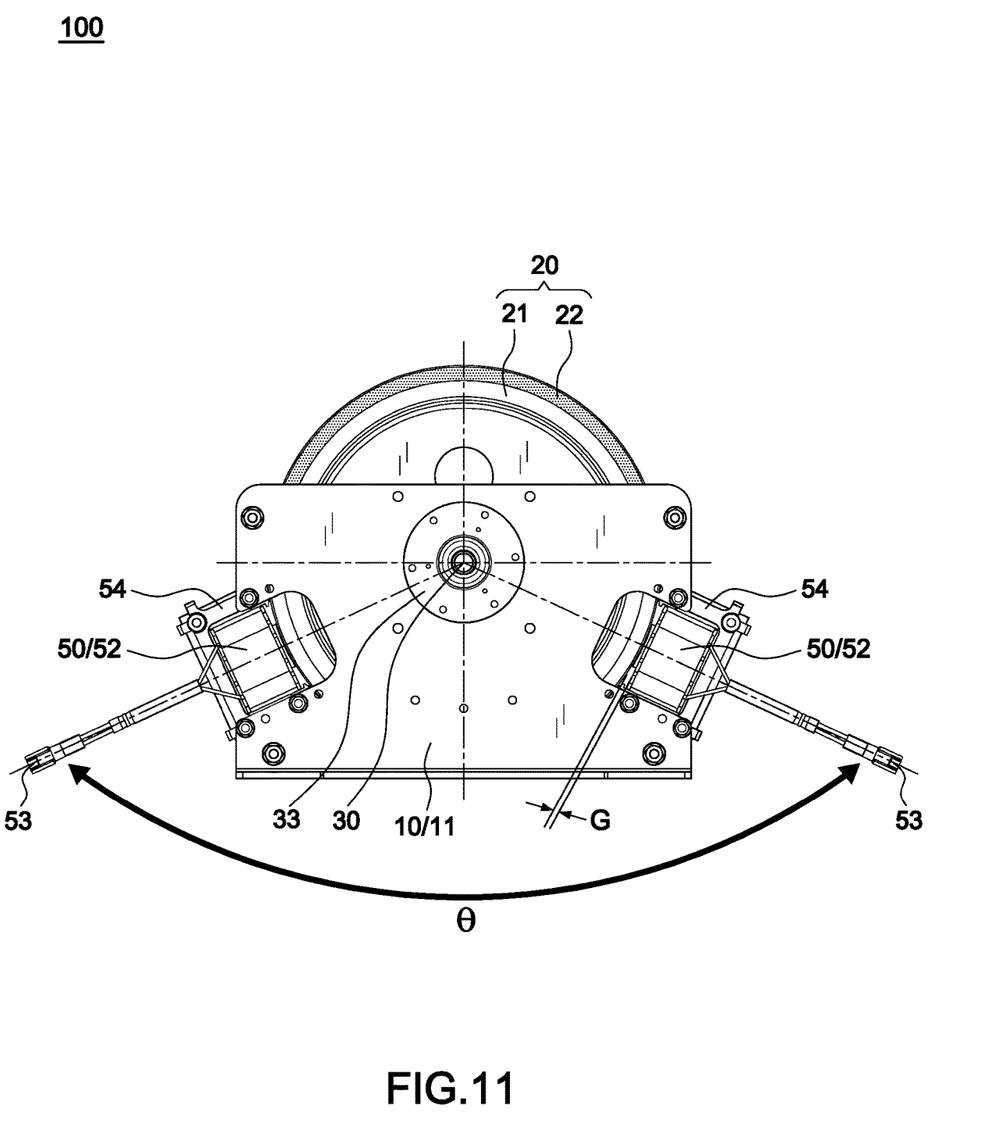
FIG. 11 is an assembly front views of the second embodiment of the present invention.

Also, at least two magnetic resistance mechanisms 50, each of them has a brake field core 51, a magnetic coil 52, an input wire 53 connected to the magnetic coil 52, a front bracket 54, and a rear bracket 55, the brake field core 51 has a containing space for arranged the magnetic coil 52; the front bracket 54 and the rear bracket 55 are arranged at the both side of the brake field core 51, and set through the brake field core 51 by a bolt, then fix the brake field core 51 at the positioning hole 14 of the front 54 and rear frame body 55;

For avoiding the magnetic field lines of the brake field core 51 of two magnetic resistance mechanisms 50 interfere with each other and make the eddy current magnetic resistance reach the highest torque, while arranging the two magnetic resistance mechanisms 50 at the outer periphery of the magnetic ring 22, the arranged angle θ has to be greater than 30 degrees and less than 180 degrees between each other; Also, for providing reluctance effect, while arranging the brake field core 51 of the front bracket 54 and the rear bracket 55, between the outer periphery of the brake field core 51 and the magnetic ring 22 require a magnetic field gap G; the arranged angle θ of the two magnetic resistance mechanisms 50 in first embodiment is greater than 30 degrees and less than 90 degrees, as FIGS. 3-6 showing; the arranged angle θ of the two magnetic resistance mechanisms 50 in second embodiment is greater than 30 degrees and less than 180 degrees, as FIGS. 10-11 showing; the limitation of arranging angle θ greater the 30 degrees not only avoid the magnetic field lines of the brake field core 51 of two magnetic resistance mechanisms 50 interfere with each other, but also make the rotation of the external rotor 20 produces a smaller yaw and increases its service life, because under the premise of producing the same torque, the two magnetic resistance mechanisms 50 can disperse the reluctance effect on two parts of the outer periphery of the magnetic ring 22, compared with only one magnetic resistance mechanism 50, the reluctance effect can only be concentrated on the outer periphery of the magnetic ring 22.

Figure 7:
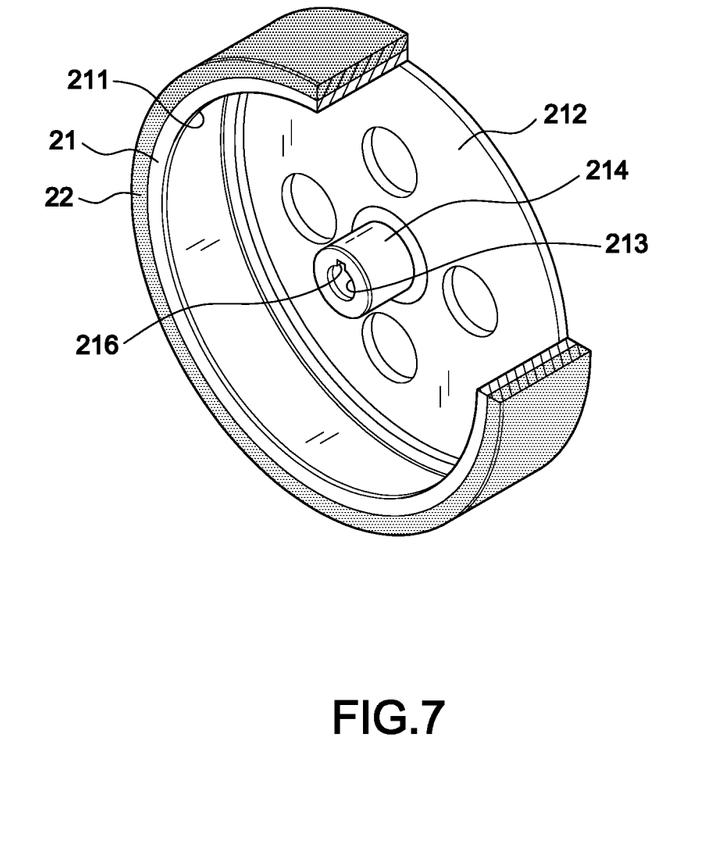
FIG. 7 is a perspective rear view of the external rotor of the present invention.

FIG. 7 is showing the structure of the external rotor 20; the external rotor 20 has a flywheel 21 and a magnetic ring 22; the flywheel 21 has an outer ring body 211 and an inner ring body 212, and at the center of the inner ring body 212 has a wheel nave 214 with a shaft hole 213; the shaft hole 213 has a key slot 216, when the shaft hole 213 is arranged on the rotate shaft 30, a connect key 215 is engaged with the key slot 216, making the rotate shaft 30 and the flywheel 21 rotate simultaneously; the magnetic ring 22 is made of material which having high magnetic flux density, in the present invention the magnetic ring 22 is made of carbon steel with carbon content 0.15~0.25%; moreover, the magnetic ring 22 is closely arranged at the outer periphery of the outer ring body 211 of the flywheel 21, or directly formed on the outer periphery of the outer ring body 211, by the magnetic permeability of the magnetic coil 52 create a closed magnetic circuit; the reason arranging the magnetic ring 22 at the outer periphery of the outer ring body 211 is to increase the magnetic flux density of the external rotor 20, and make the brake field core 51 of the magnetic resistance mechanism 50 create a larger eddy current magnetic resistance with out causing extra producing cost; But the material of the magnetic ring 22 and the arrangement of the magnetic ring 22 of the present invention is not limited to such application.

Figure 8:
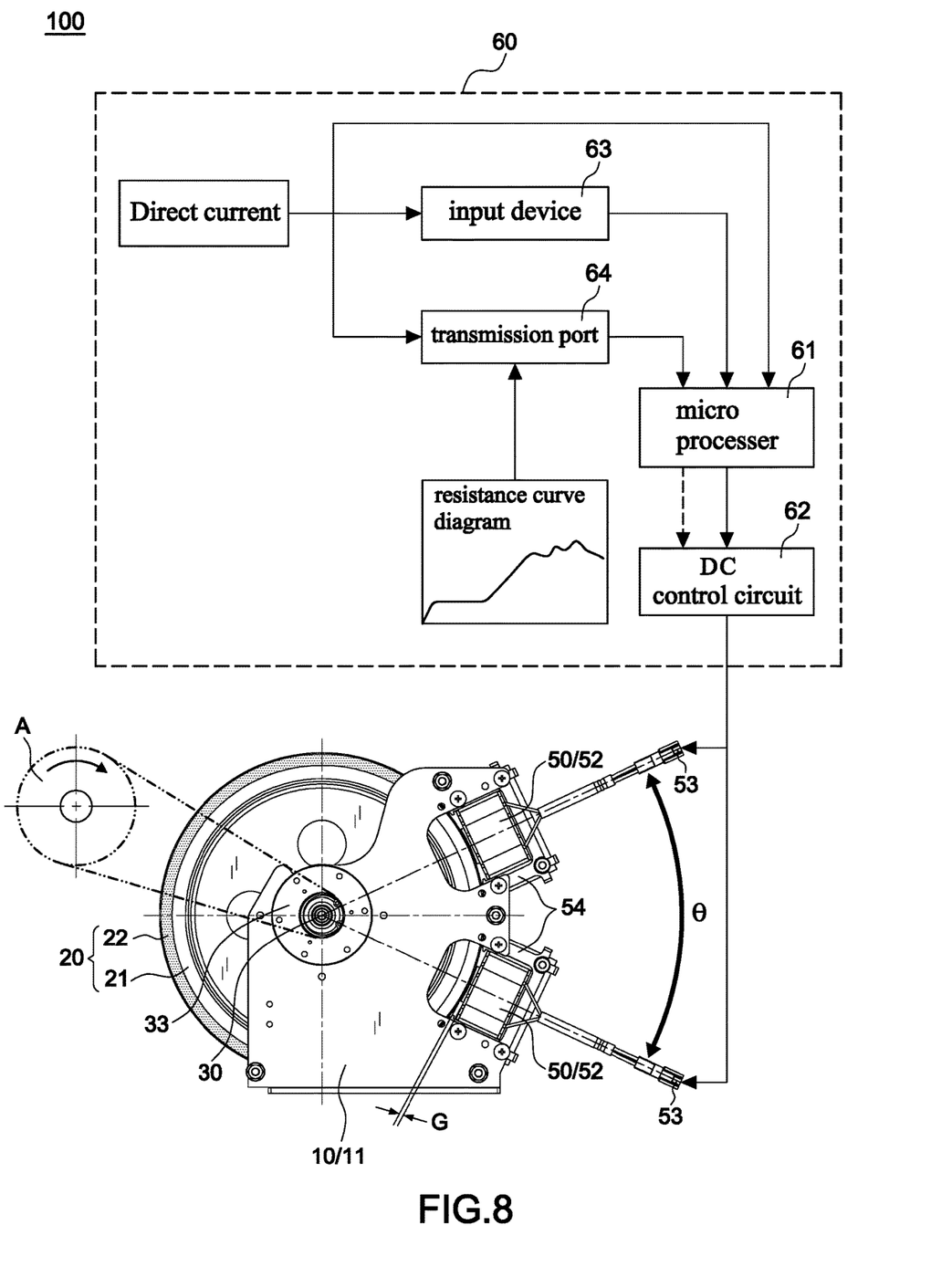
FIG. 8 is a schematic diagram illustrating structure of the present invention in the first embodiment.

FIG. 8 is illustrating the arrangement of the first embodiment of the present invention, including: a control circuit unit 60 installed on the side of the support frame 10 in a built-in form, the control circuit unit 60 has at least a micro processor 61, a DC control circuit 62, an input device 63 for inputting required torque value, and a transmission port 64 for loading the resistance curve diagram; the exercise force applied by the user drives the transmission mechanism A of the fitness equipment that linked to the transmission wheel 40 to make the external rotor rotate 20. After the user inputs the desired torque value of the exercise by the input device 63 and selects the desired resistance curve by the transmission port 64, the microprocessor 61 refers to the trajectory of the resistance curve and the torque setting value, and then sends the correct signal to the DC control circuit 62 for providing a suitable current transmitted to the input wire 53 of the magnetic resistance mechanisms 50, and the current of the magnetic coil 52 will generate a magnetic field on the brake field core 51 through the principle of electromagnetic induction, then a closed magnetic circuit is formed between the magnetic field and the coupled rotated magnetic ring 22; since the external rotor 20 is rotating, the closed magnetic circuit will be destroyed, according to Lenz's law, when a stable magnetic circuit is destroyed by external force, a reverse resistance of the same magnitude will be produced to resist so as to achieve the effect of providing an exercise load, and the microprocessor 61 keeps refer to torque value setting and control the current of the magnetic coil 52 by the DC control circuit 62 for making the reluctance equal to the torque value that user inputted, so as to achieve the effect of having required exercise load.

Figure 9:
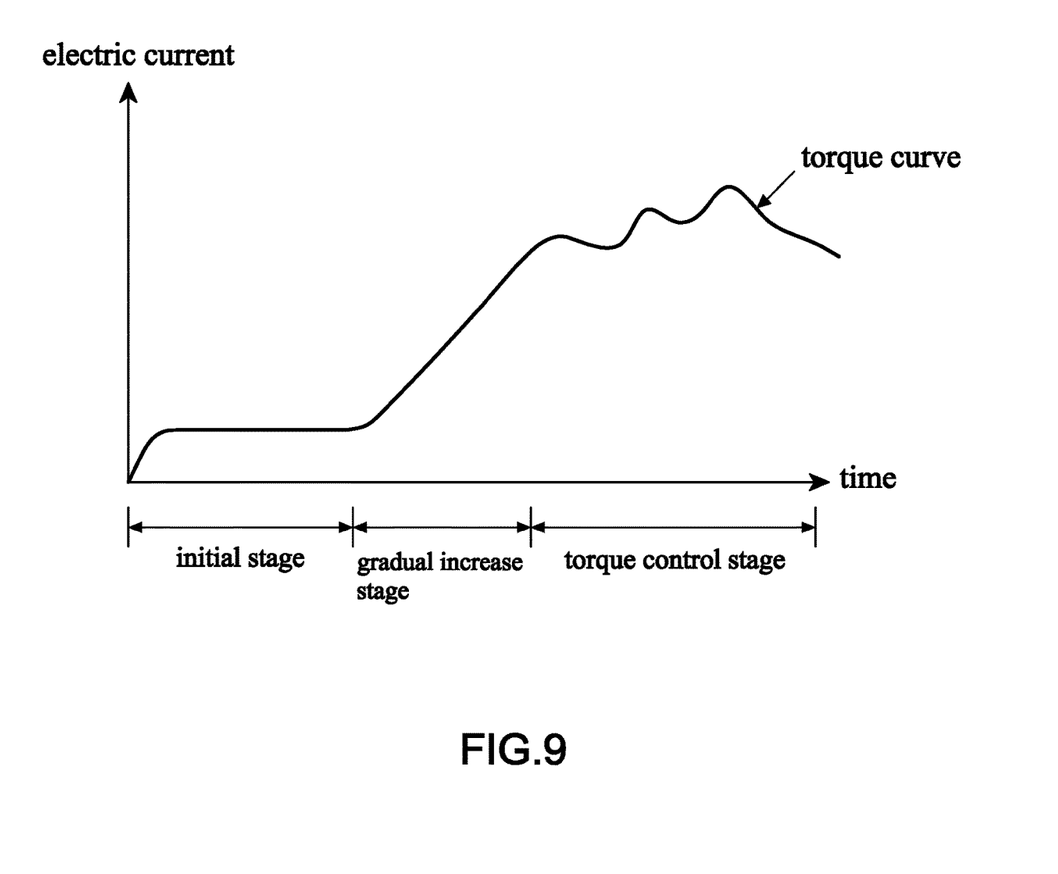
FIG. 9 is a schematic diagram illustrating the loading of the resistance curve diagram of the present invention.

Referring to FIG. 9, a schematic diagram of the resistance curve of the exercise, the resistance curve has many graphs of different difficulty. Basically its resistance is set to the initial stage, the gradual increase stage, and the torque control stage; when the input current is unchanged at the initial stage, the input current of the gradual increase stage will increase its resistance linearly, and the input current will be automatically adjusted according to the torque setting conditions at the torque control stage; Because the resistance curve diagram allows the user to feel the smooth resistance of different difficulties, it can not only improve the comfort but also avoid the injury caused by the sudden resistance change. Therefore, by choosing different resistance curve diagram can increase the variability of exercise and improve the comfort of exercise.

The external rotor 20 of the present invention is drove by the transmission wheel 40 and rotate, including a flywheel 21 for providing inertia rotation and a magnetic ring 22 having high magnetic flux density; two magnetic resistance mechanisms 50 arranged at the outer periphery of the magnetic ring 22, and between the outer periphery of the brake field core 51 and the magnetic ring 52 has a magnetic field gap G for providing reluctance; the present invention has a input device 63 for inputting desired torque, and the DC control circuit 62 will provide a suitable current to the magnetic coil 52 for generating exercise load; Since the stator coil and AC/DC conversion components required for power generation are not arranged in the present invention, it can simplify the mechanism, reduce the volume, and reduce the manufacturing cost, and it can be applied to small fitness equipment; The present invention controls the reluctance load by the magnitude of the current applied to the magnetic coil 52. Since the mechanism is a non-contact resistance device, the present invention also has the advantages of easy control of resistance, no wear of components, and low maintenance cost.

Also, the external rotor 20 of the present invention includes a flywheel 21 for providing inertia rotation and a magnetic ring 22 having high magnetic flux density, and the magnetic ring 22 arranged closely on the outer periphery of the flywheel 21, and the transmission wheel 40 drives the external rotor 20 to rotate; two magnetic resistance mechanisms 50 arranged at the outer periphery of the magnetic ring 22, and between the outer periphery of the brake field core 51 and the magnetic ring 22 has a magnetic field gap G; since a suitable current is transmitted to the magnetic coil 52 of the magnetic resistance mechanisms 50, and the current of the magnetic coil 52 will generate a magnetic field on the brake field core 51, according to Lenz's law, the magnetic field will give a reverse resistance of the same magnitude to the magnetic ring 22; since the magnetic ring 22 having high magnetic flux density and the magnetic resistance mechanisms 50 are arranged at the outer periphery of the magnetic ring 22 and form an angle greater than 30 degrees and less than 180 degree, than the magnetic lines of the brake field core 51 will not interfere with each other, and the eddy current reluctance will reach the highest torque, so the present invention can achieve the effect of high-efficiency exercise loads.

Also, the present invention includes an input device 63 for inputting required torque value, and a transmission port 64 for loading the resistance curve diagram; After the user key in the required torque value, the micro processor 61 of the control circuit unit 60 calculates the required torque value and the resistance curve diagram, the micro processor 61 further provides a suitable current transmitted to the magnetic coil 52 of the magnetic resistance mechanisms 50, then between the brake field core 51 and the magnetic ring 22 produced a eddy current magnetic resistance and forms a reverse resistance to the external rotor 20. Because the resistance curve diagram allows the user to feel the smooth resistance of different difficulties, it can not only improve the comfort but also avoid the injury caused by the sudden resistance change. Therefore, by choosing different resistance curve diagram can increase the variability of exercise and improve the comfort of exercise.

What is claimed is:

1. A reluctance brake device for fitness equipment, comprising:
    a support frame having a front frame body and a rear frame body fixed by multiple positioning rods, and the support frame having a fixing base for fixing on the frame of the fitness equipment, the front frame body and a rear frame body each having at least a pair of positioning holes;
    a rotate shaft pivoted in a shaft hole of the support frame;
    a transmission wheel pivoted on the rotate shaft and located on an axially outer side of the support frame for receiving power transmitted by the fitness equipment;
    an external rotor including a flywheel and a magnetic ring, the flywheel has a wheel nave arranged at a center and the wheel nave has a shaft hole for setting the wheel nave on the rotate shaft, the magnetic ring has a certain magnetic flux density and arranged closely on an outer periphery of an outer ring body of the flywheel, and the transmission wheel drives the external rotor to rotate;
    at least two magnetic resistance mechanisms, each of the magnetic resistance mechanisms has a brake field core, a magnetic coil, an input wire connected to the magnetic coil, a front bracket, and a rear bracket, each of the brake field cores has a containing space for arranging a corresponding one of the magnetic coils, the front bracket and the rear bracket of each of the two magnetic resistance mechanisms fix a corresponding one of the brake field cores at a respective one of the positioning holes of the front frame body and rear frame body, the magnetic resistance mechanisms being arranged at an outer periphery of the magnetic ring and form an included angle therebetween greater than 30 degrees and less than 180 degrees, and a magnetic field gap being disposed between an outer periphery of the brake field core and the outer periphery of the magnetic ring; and
    a control circuit unit installed on an axially outer side of the support frame, the control circuit unit having at least a micro processor, a DC control circuit, an input device for inputting a required torque value, and a transmission port for loading a resistance curve diagram, and the control circuit being connected to a source of direct current and electrically connected to the input wire of the magnetic coil;
    whereby the micro processor calculates a required torque value and outputs a control signal corresponding to the required torque value to the DC control circuit, the DC control circuit outputs a current transmitted to the magnetic coils of the magnetic resistance mechanisms responsive to the control signal, and the current of the magnetic coils respectively generate magnetic fields on the brake field cores corresponding thereto to form closed magnetic circuits between the brake field cores and the magnetic ring as the magnetic ring rotates along with the external rotor, wherein the closed magnetic circuit will be interrupted responsive to a stable magnetic circuit being interrupted by an external force, and a reverse resistance of an equal magnitude will be produced to resist the external force.

2. The reluctance brake device as claimed in claim 1, wherein the included angle of the two magnetic resistance mechanisms is larger than 30 degrees and smaller than 90 degrees.

3. The reluctance brake device as claimed in claim 1, wherein the included angle of the two magnetic resistance mechanisms is larger than 90 degrees and smaller than 180 degrees.

4. The reluctance brake device as claimed in claim 1, wherein the transmission wheel is a belt pulley.

* * * * *